(12) United States Patent
Ümit et al.

(10) Patent No.: US 7,628,105 B2
(45) Date of Patent: Dec. 8, 2009

(54) ROTATING SPIT (75) Inventors: Can Ümit, Braunschweig (DE); Cengiz Ümit, Braunschweig (DE)

(73) Assignee: Tan Mutfak Makina, Gida Sanayi Ve Ticaret Ltd. STI, Aydin (TR)

( * ) Notice: Subject to any disclaimer, the term of this patent is extended or adjusted under 35 U.S.C. 154(b) by 585 days.

(21) Appl. No.: 10/529,387

(22) PCT Filed: Oct. 6, 2003

(86) PCT No.: PCT/DE03/03319

§ 371 (c)(1),
(2), (4) Date: Sep. 12, 2005

(87) PCT Pub. No.: WO2004/032693

PCT Pub. Date: Apr. 22, 2004

(65) Prior Publication Data

US 2006/0144247 A1    Jul. 6, 2006

(30) Foreign Application Priority Data

Oct. 4, 2002   (DE) ............................... 102 46 304
Oct. 4, 2002   (DE) ............................... 102 46 305

(51) Int. Cl.
*A47J 37/04* (2006.01)
(52) U.S. Cl. .............. 99/419; 99/421 P; 99/421 TP; 99/421 V; 219/385; 219/404
(58) Field of Classification Search ............... 219/404
See application file for complete search history.

(56) References Cited

U.S. PATENT DOCUMENTS

| | | | | |
|---|---|---|---|---|
| 354,194 A | | 12/1886 | Herd | |
| 2,251,736 A | * | 8/1941 | Hill | ................................ 62/225 |
| 2,835,480 A | * | 5/1958 | Perez | ..................... 165/104.21 |
| 2,848,592 A | * | 8/1958 | Mergen | ....................... 219/404 |
| 2,850,211 A | * | 9/1958 | Fernandez | ..................... 222/67 |
| 2,888,872 A | * | 6/1959 | Bathe | ........................... 99/479 |
| 3,011,323 A | * | 12/1961 | Jaeger | ......................... 62/396 |
| 3,339,480 A | * | 9/1967 | Raman et al. | .............. 99/421 H |

(Continued)

FOREIGN PATENT DOCUMENTS

DE    3104636    8/1982

(Continued)

OTHER PUBLICATIONS

Translated German Office Action for related German Application DE 102 46 305.

(Continued)

*Primary Examiner*—Joseph M Pelham
(74) *Attorney, Agent, or Firm*—Greenblum & Bernstein P.L.C.

(57) ABSTRACT

The invention relates to a rotating spit with a central body (10), for supporting foodstuffs (2), in particular layered meat and layered meat products, arranged around the central body (10) and a heating element (3) acting from outside on the foodstuff (2). The aim of the invention is to improve the state of the art such that the layered foodstuff may remain perfectly fresh and hygienic over a longer period. Said aim is achieved whereby the central body (10) is provided with cooling.

10 Claims, 5 Drawing Sheets

U.S. PATENT DOCUMENTS

| | | | | |
|---|---|---|---|---|
| 3,777,655 | A * | 12/1973 | Ainsworth | 99/532 |
| 4,023,379 | A * | 5/1977 | Zevlakis | 62/258 |
| 4,129,066 | A * | 12/1978 | Corley | 99/345 |
| 4,190,100 | A * | 2/1980 | Wallace | 165/48.1 |
| 4,663,517 | A * | 5/1987 | Huff et al. | 219/404 |
| 4,762,327 | A * | 8/1988 | Gomez | 62/258 |
| 4,810,856 | A * | 3/1989 | Jovanovic | 219/401 |
| 4,848,091 | A * | 7/1989 | Border | 62/3.2 |
| 5,025,639 | A * | 6/1991 | Thomas | 62/258 |
| 5,771,709 | A * | 6/1998 | Smith | 62/389 |
| 5,801,357 | A * | 9/1998 | Danen | 219/403 |
| 5,918,534 | A * | 7/1999 | Medina | 99/342 |
| 6,125,740 | A | 10/2000 | Hedrington et al. | |
| 6,502,501 | B1 * | 1/2003 | Simon | 99/345 |
| 6,692,783 | B2 * | 2/2004 | Hunter | 426/281 |
| 6,725,764 | B2 * | 4/2004 | Sherwin | 99/419 |
| 6,809,297 | B2 * | 10/2004 | Moon et al. | 219/400 |

FOREIGN PATENT DOCUMENTS

| | | |
|---|---|---|
| DE | 69101473 | 1/1992 |
| DE | 19740659 | 3/1999 |
| FR | 2732881 | 10/1996 |
| JP | 3311881 | 8/1931 |
| JP | 2006000315 A * | 1/2006 |

OTHER PUBLICATIONS

Translated German Office Action for related German Application DE 102 46 304.2.

* cited by examiner

ROTATING SPIT

FIELD OF THE INVENTION

The invention relates to a rotating spit, with a central body for supporting foodstuffs.

BACKGROUND OF THE INVENTION

Rotating spits are suitable in particular for preparation of doner kebabs or gyros or the like. To prepare food, the rotating spits are equipped with a heat radiator or heating element which acts on the foodstuffs from outside and grills said foodstuffs.

Rotating spit grills are generally known and have become widely used, especially in the fast food sector. To prepare the food, individual pieces of meat are placed onto the generally vertical central body and, by turning the spit relative to the heating element, in particular the heat radiator, the foodstuffs or meat are grilled and are then cut off in portions with a knife from the top downward. In this way, a core area of the foodstuffs layered on the central body, and not yet grilled, is exposed to the heating action of the heating element or heat radiator, as a result of which a further layer of the foodstuffs is grilled and cooked in a short time. DE 197 40 659 C2 discloses a device of this kind. A device for preparing meat is known from DE 691 01 473 T2, said device having an outer housing and an inner housing and also a fan for circulating cold air in the space between the inner housing and the outer housing. In this way, the bottom of the processing area in which meat is prepared is cooled more strongly than the top, and fat sprayed onto the bottom runs down instead of adhering to it and possibly burning. The cold air does not come into contact with the foodstuffs that are to be prepared.

Especially in the case of large rotating spits with corresponding amounts of foodstuff, it may happen that a relatively long period of time elapses before all of the foodstuff or meat is completely grilled and used up. This can lead to a situation where the generally raw meat near the central body dries out or even turns rotten.

SUMMARY OF THE INVENTION

The object of the present invention is to improve the prior art in such a way that the layered foodstuffs remain perfectly fresh and hygienic over a longer period of time.

According to the invention, this object is achieved by a rotating spit having a central body.

Cooling the central body means that the core of the layered foodstuffs remains cold, preferably frozen, as a result of which the foodstuffs keep fresh for a longer period of time. This also reduces the risk of the foodstuffs rotting, and this means that the foodstuffs can be grilled over a longer period of time.

One possible way of cooling the central body is for a hollow space located in the central body to be filled with a cold accumulator or with a cooled medium, so that the core of the layered foodstuffs, or the foodstuffs located radially near to the central body, are cooled over a period of time through the wall of the central body. To do this, a suitable cooling medium which takes up the heat from the foodstuffs simply has to be introduced into the hollow body. If appropriate, the cooling medium can be replenished.

To obtain continuous cooling of the central body and thus also of the foodstuffs, provision is made that the central body has at least one channel through which cooled medium flows, so that heat is removed continuously from the foodstuffs. By being suitably routed through the inside of the central body, for example in a meandering configuration, this channel can provide continuous and almost complete peripheral cooling of the wall of the central body. The channel can also be configured in such a way that it runs behind a large part of the outer surface of the central body.

To replenish the cooled medium, it is advantageous if the central body is coupled to a heat exchanger in such a way that the heat taken up from the foodstuffs is taken up via the cooled medium and emitted via the heat exchanger to the environment. For this purpose, the generally known refrigerator technique is applied, with a closed circulation of cold air being used for reasons of hygiene and energy. With an open circulation, cooled air can also for example be introduced into the central body and then emitted into the environment.

To ensure effective flow through the central body, at least one delivery channel and at least one removal channel for the cooled medium are formed inside the central body, in which case a propitious arrangement of the channels ensures cooling of the central body over a large surface area.

To be able to grill the foodstuffs as far as possible from all sides, the central body can turn relative to the heating element and is preferably driven by a motor, in which case the central body and/or the heating element are mounted rotatably.

In a development of the invention, provision is made that, arranged at a radial spacing from the central body, there is at least one cooling element which is coupled to the central body in a removable manner, in order to ensure that, even with large amounts of foodstuffs of a correspondingly large diameter, sufficient cooling is also permitted at a greater distance from the outer wall of the central body. Particularly in the area between central body and radially spaced cooling element, effective cooling of the foodstuffs located there is achieved since, as viewed in the radial direction, cooling and removal of heat is possible on both sides. The releasable coupling to the central body has the advantage that, after the foodstuffs have been prepared and cut off as far as the cooling element or cooling elements, all that has to be done is to simply remove the cooling element, without having to interrupt the preparation activity for any length of time. After the cooling element has been removed, it is possible to continue immediately with the further preparation of the foodstuffs, in particular with grilling.

The cooling element is advantageously oriented substantially parallel to the central body, with various alternatives in respect of its configuration. In addition to a cylinder wall configuration of the cooling element, which leads to an annular gap between the central body and the inner wall of the cooling element, it is also possible to provide individual rod-shaped or plate-shaped cooling elements oriented coaxially with respect to the longitudinal extent of the central body. A cap-shaped, removable cover for the layered foodstuffs is preferably formed in the area between the central body and the cooling element to prevent drying-out from the top; it is also possible for a cooling medium to flow through the cap-shaped cover or for the latter to be filled with this cooling medium, in order to obtain a cooling effect from the top.

In addition to filling the cooling elements with a cooled medium, provision is also made that the cooling element is provided with at least one channel through which a cooled medium flows, so that heat energy can be removed through the cooling element over a long period of time.

Provision is further made that the central body of the rotating spit is provided with outlet openings which communicate with channels inside the foodstuffs in such a way that the cooled medium flows through the foodstuffs. The cooled medium in this case is preferably air which comes directly into contact with the foodstuff, so that direct transfer of heat can take place. The formation of suitable flow channels inside the foodstuffs has the advantage that any cooling elements let into the foodstuffs do not have to be removed. Moreover, the outlay in terms of equipment is reduced, and any desired number of cooling channels can be formed inside the foodstuff itself. In this way, very effective cooling is made possible, even of large items of foodstuff, in particular spits of meat. As soon as the outer layers of the foodstuffs have been suitably cut off until the channels inside the foodstuffs appear at the surface, suitable closure mechanisms are actuated in order to prevent uncontrolled escape of the cooling medium, in particular cooled air. The channels inside the foodstuffs or meat product are also advantageously formed as a delivery line and a removal line, so that a closed system of the coolant circuit can be produced. The channels are produced, for example, by insertion of rods which are removed after finishing and in particular after freezing in order to preserve the foodstuff spit.

In a development of the invention, provision is made that the channels formed inside the foodstuffs are connected to the coolant stream via a cover or cover cap which is to be placed on the top end of the central body, this cover cap having inlet and outlet lines for the corresponding channels. In the simplest case, the coolant channels extend inside the foodstuffs parallel to the longitudinal extent of the central body, and a cap divides the coolant stream arriving via the inlet line into one or more channels which communicate with a corresponding return channel inside the foodstuff. At the upper end of the return channel there are corresponding outlet lines which are formed on the cap and communicate with the return channel of the central body. In this way, not only is the outer wall of the central body cooled with return of the heated coolant stream, there is also direct cooling of the foodstuff spit in a continuous coolant stream.

In an alternative to a configuration of the inlet and outlet lines via a cover, provision is made that radially oriented openings are formed in the outer wall of the central body and communicate with the channels formed inside the foodstuffs. These openings can be alternately closed so that cooling can furthermore be effectively carried out when the central body is relayered at a low height. This permits suitable re-layering of the central body according to requirements.

The necessary cooling compressor is designed for the deep freeze area so that the core of the foodstuffs layered around the central body can remain deep-frozen. To consume the least possible energy, the coolant circuit is closed, and air in particular is circulated through the central body and the channels possibly formed in it and through the cooling element. This air as coolant is continuously cooled via a heat exchanger; the device for cooling the medium is either accommodated under the central body in a corresponding work panel or counter or can be accommodated at another location, for example in cellar rooms.

Provision is further made that a U-shaped holder is present and that the heating element is secured on one side with its lower end on the upper branch of the holder, the upper branch of the holder being arranged underneath the foodstuffs, in such a way that the foodstuffs are exposed completely to the heat generated via the heating element. For cleaning and transport purposes, the heating element is designed so that it can be removed from the holder.

In a variant of the invention, the rotating spit has no cooling, that is to say is provided with a central body for supporting foodstuffs, in particular layered meat and layered meat products, arranged around the central body, and a heating element acting from outside on the foodstuffs is arranged close by.

The heating element is in this case provided, at its lower end, with a device by which it is secured pivotably and displaceably on a U-shaped holder on one side, with its lower end on the upper branch of the holder, the upper branch of the holder being arranged underneath the foodstuffs.

The invention further relates to a central body for supporting foodstuffs, in particular layered meat and layered meat products, arranged around the central body, the central body being provided with cooling. As regards the concrete design of the central body, reference is made to the above remarks.

BRIEF DESCRIPTION OF THE DRAWINGS

Illustrative embodiments of the invention are explained in more detail below with reference to the attached figures. Identical reference numbers in the figures designate identical components.

DETAILED DESCRIPTION OF THE PREFERRED EMBODIMENTS

Figure 1:
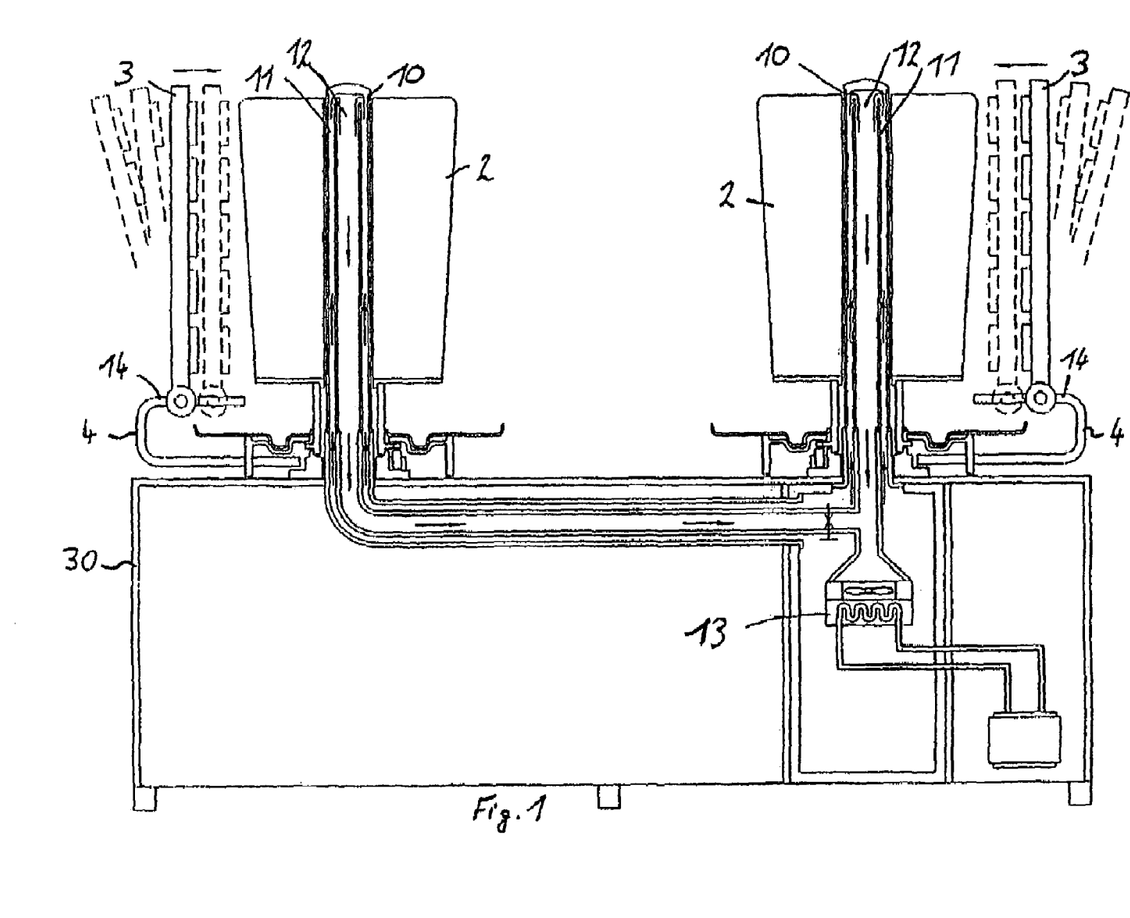
FIG. 1 shows a cross-sectional view of a rotating spit with heating element.

FIG. 1 shows, in a cross-sectional view, a preparation station for doner kebabs or gyros, with two rotating spits which are arranged alongside one another and which have a rotatably mounted central body 10 and, spaced apart from the latter and perpendicularly, plates for supporting foodstuffs 2. The foodstuffs 2 are layered on top of one another and arranged around the central body 10. Arranged laterally apart from the periphery of the foodstuffs there are heat radiators 3 whose distance and inclination relative to the central body 10 can be varied. Formed inside the central body 10 there are channels 11, 12 through which there flows a cooling medium, for example conveyed by a pump, the flow being indicated by the arrows. The cooled medium, preferably cooled air, or alternatively a coolant or cold water, is guided through the channels 11 arranged on the outer wall of the central body 10 and thus draws the heat from the foodstuffs 2 arranged around the central body 10 or keeps the foodstuffs 2 cooled. A return channel 12 is arranged centrally inside the central body 10 and guides the heated medium to a heat exchanger 13, which functions in the manner of a refrigerator. The corresponding components for cooling of the medium, for example heat exchanger, throttle, compressor and the like are generally known and are not described in detail here.

FIG. 1 shows a number of central bodies 10 arranged alongside one another and connected to a single coolant supply, the coolant being in the form of a circulation of air which is cooled at the heat exchanger 13 and is then delivered through the corresponding channels of the central bodies. The cooled air can be dehumidified, filtered and sterilized to permit hygienic and safe cooling.

As an alternative to continuous cooling and constant delivery and removal of coolant, provision is made that the central body 10 is filled with a cooled medium which has a corresponding cooling effect on the foodstuffs 2 in the environment of the central body 10.

Likewise, the coolant can be routed through a single-channel helix shape or circulated through a cylindrical annular gap.

Figure 2:
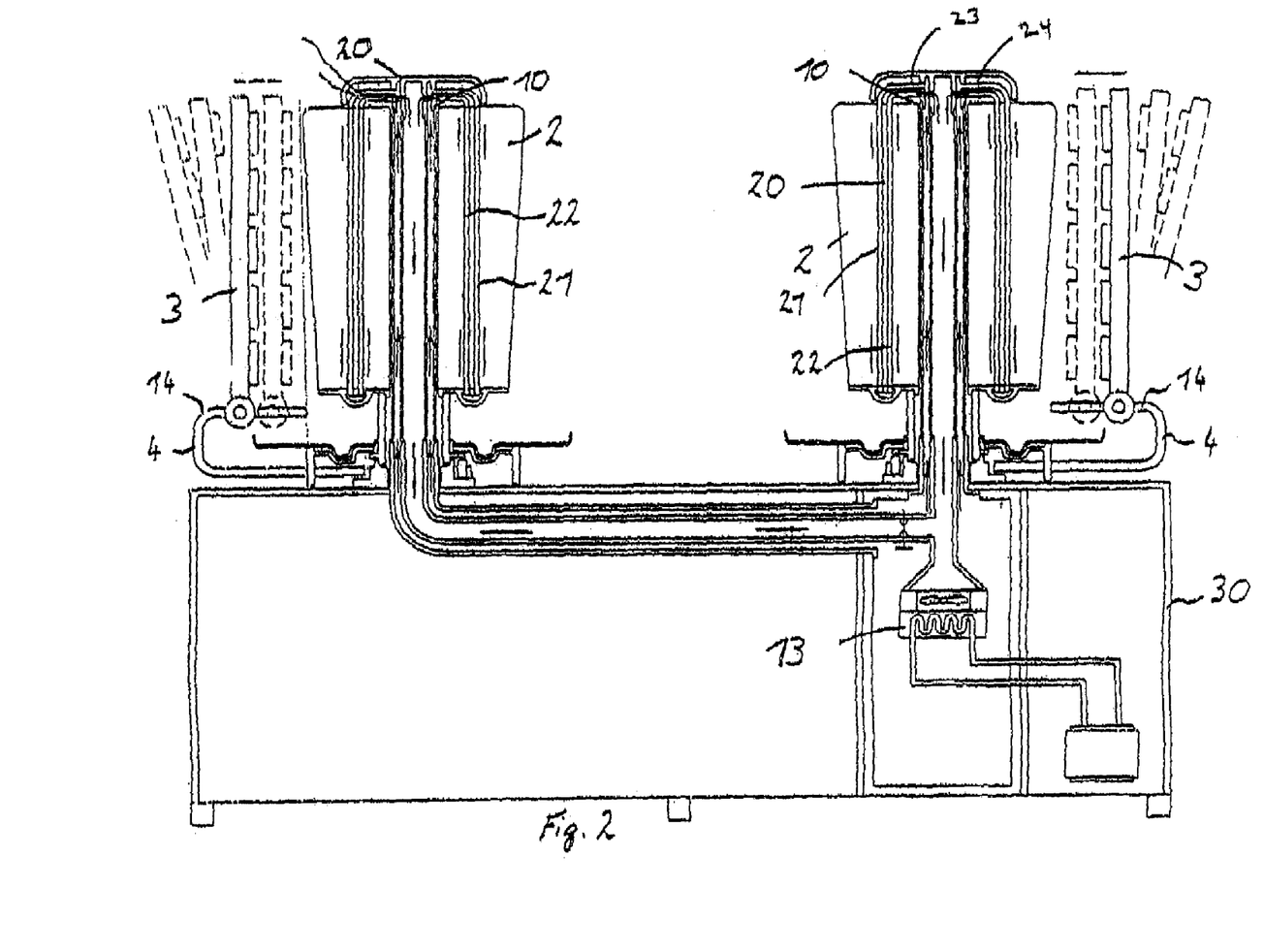
FIG. 2 shows a rotating spit with a cooling element arranged parallel to a central body.

FIG. 2 shows a development of the invention according to FIG. 1 in which a cover cap element 20 is placed onto an upper opening of the central body 10 and which, by being placed onto the central body 10, is connected to the coolant circuit. The cover cap element 20 has inlet and outlet lines 23, 24 connected to corresponding channels 11, 12 of the central body 10. The inlet and outlet lines 23, 24 connect the coolant stream to cooling elements 21, 22 which run parallel to the central body 10 and through which the same cooled medium flows. The coolant is delivered into the rods or walls of the cooling elements 21, 22 via a bypass in the admission channel 11 of the central body i0 and guides the cooled medium through the inlet line 23 and the cooling element 21. The cooling element 22, serving as return channel, opens via the outlet line 24 into the return channel 12 of the central element, so that a branching of the circulation of the cooled medium or coolant is realized by simple fitting. For food technology reasons, cooled air is used; alternatives are possible.

Instead of cooling elements being formed, cooling channels can be worked directly into the foodstuff 2 so that the inlet and outlet lines 2, 24 introduce the cooling air directly into the foodstuff body 2.

The cover cap 20 is removable and can be replaced by a cover of smaller diameter, so as to adapt to the changing diameter of the foodstuff 2 when the outer cooling channels are cut open and lie exposed to the outside.

Alternatively to flow through a cooling element 21, 22, the cooling element 21, 22 can be filled with a cooled medium in order to permit longer cooling of the layered foodstuffs.

The variant according to FIG. 2 has the advantage that the large volume of foodstuffs 2 can be effectively cooled without loss of maneuverability and ease of preparation of the foodstuffs 2 by means of the heat radiator 3. After the first layers of the prepared food have been cut from the original body of foodstuff, the cover cap 20 can be removed and the cooling element 21, 22 can be removed, so that there is only cooling of the central area through the central body 10.

In addition to delivery of cooled air from above through the cover cap 20 and the corresponding inlet and outlet lines 23, 24, provision is made that cooled air flows laterally from openings in the outer wall of the central body 10 into correspondingly arranged channels which communicate with the openings and are formed inside the layered foodstuffs. These openings can be closed either manually or by electronic control means which, by way of sensors, regulate suitable opening or closing via closure devices. The corresponding openings inside the outer wall of the central body 10 are closed by slides, for example.

FIGS. 1 and 2 show a complete preparation station for doner kebabs and gyros on a bottom cabinet 30, where part of the bottom cabinet 30 would be used as a refrigerator. The heat exchanger 13 is arranged in a closed-off space in the bottom cabinet 30 from which the cooled air is conveyed into the respective central bodies. This space is deep-cooled and, via heating lines, the adjacent spaces of the bottom cabinet 30 are likewise cooler than the environment and can be used, for example, as refrigeration counters for storing drinks or foods such as vegetables or salads. The motor for the cooling can either be arranged in the bottom cabinet 30 too or can be arranged at a different location, for example in another room. Likewise, a completely external air supply system can be realized.

To avoid icing of the whole system, it is important that the circulation remains closed, and, if appropriate, the returned air is to be dehumidified in order to avoid icing of the system.

The heat radiators 3 which are arranged to the side of the rotating spit are adjustable both in terms of their inclination and also their distance with respect to the central body 10, simply by being secured pivotably and displaceably at their lower end on a corresponding guide and bearing. The heating elements 3 can be easily removed from the guide and fitted, likewise the heating elements 3 can be removed for transport purposes or simply folded down so that a simple and inexpensive packaging is possible.

The double-walled central bodies 10 are simply fitted onto a suitable support and thus establish the connection to the coolant stream. Gaps possibly present in the contact area between central body 10 and a suction ventilator provided for suitable return flow generally close automatically as a result of icing. In this way it is possible for the rotating spit to be alternately operated with or without cooling. If appropriate, a cooling system can also be added on, in other words the central body can initially be operated without a cooling unit and then, if required, provided with a cooling system.

The invention can of course also be used without an associated heat radiator 3 for cooling stacked foodstuffs and keeping them fresh. Such an application is provided for ready-prepared foods or those foods which are not to be grilled and which can or should be mounted on a central body 10. For better accessibility, the central bodies 10 are rotatable, preferably driven by motor.

Figure 3:
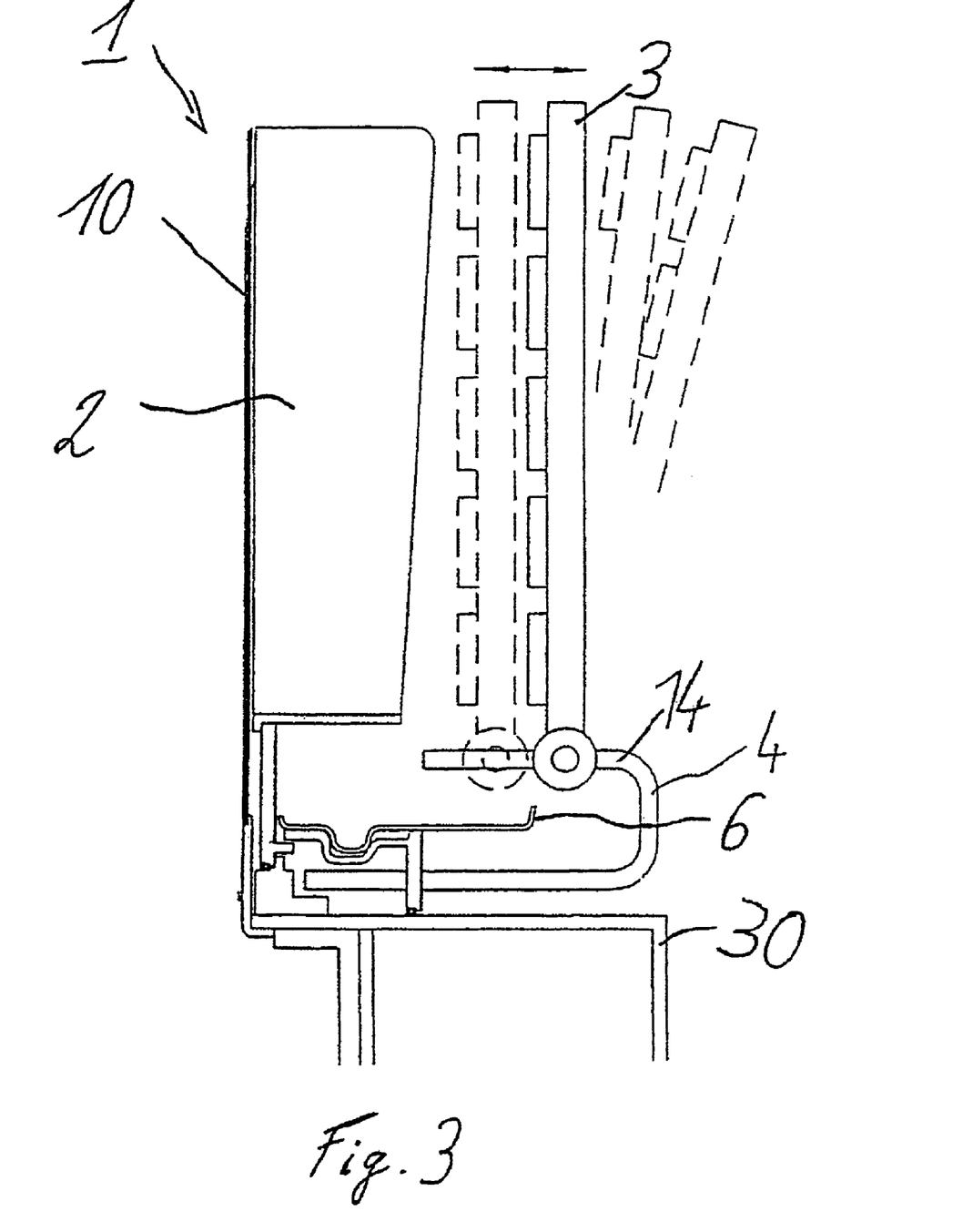
FIG. 3 shows a side view of a heating element holder.

FIG. 3 shows a side view of a rotating spit grill 1 with a central body 10 around which foodstuffs 2, preferably flat meat or minced meat, is layered. The central body 10 is mounted rotatably in a support, the central body 10 preferably being driven by a motor. The support is mounted on a bottom cabinet 30 or a refrigeration counter on which there is also a holder 4 which is designed as a U lying on its side and with one branch longer than the other. The lower branch of the holder 4 is mounted on the bottom cabinet 30 and can alternatively be arranged on the support of the rotating spit 10.

A heating element 3 is secured on the upper branch 14 of the holder 4, said heating element 3 being secured on one side at its lower end. The heating element 3 can be moved along the upper branch 14 of the holder 4 and can be locked in place, so that the distance between the heating element 3 and the central body 10 and thus also its distance from the foodstuffs 2 to be grilled can be varied. Likewise, the heating element 3 is mounted pivotably via a hinge at the lower end, and this hinge too can be locked in order to keep a set inclination of the heating element 3.

By virtue of the displaceable and pivotable manner in which the heating element 3 is secured on the holder 4, it is possible not only to achieve an optimal orientation of the heating element 3 with respect to the foodstuffs 2 to be grilled, but also a space-saving and compact structure, and this without the need for the previously customary frame or retaining bracket which was formed above the heating element and the central body in order to receive these. For transport or for cleaning purposes, the central body 10 can simply be removed from the support, and the heating element 3 can be folded horizontally so that a small packaging volume is obtained. Easy access to the rear face of the heating element 3 is likewise afforded, making the heating element 3 easier to clean.

The central body 10 is simply fitted onto the support, the foodstuffs 2 already having been layered around the central body 10. The heating element 3 extending substantially parallel to the longitudinal extent of the central body 10 is oriented in inclination and distance with respect to the foodstuffs 2 to be grilled and then switched on, and the preparation process can begin.

The formation of the holder 4 as a U-shaped support has the advantage that, on the one hand, the area of connection of the two horizontal branches provides a protective action for the support of the central body 10; moreover, the space between the branches can be used to receive a collecting plate 6 to catch the fat dropping from the foodstuffs 2.

The support for the central body 10 and the holder 4 can be designed as a structural unit, completed by the heating element 3, the collecting plate 6 and the fitted central body 10. This arrangement can then be mounted on the bottom cabinet 30, which can serve at the same time as refrigeration counter for drinks or other foodstuffs, and a motor-type drive can be 10 integrated in the support for the central body 10. Alternatively, the rotating spit grill 1 can be produced, assembled and supplied complete with the bottom cabinet, and, by folding the heating element 3 down after the central body 10 has been removed, the overall height and thus the packaging volume is reduced.

Figure 4:
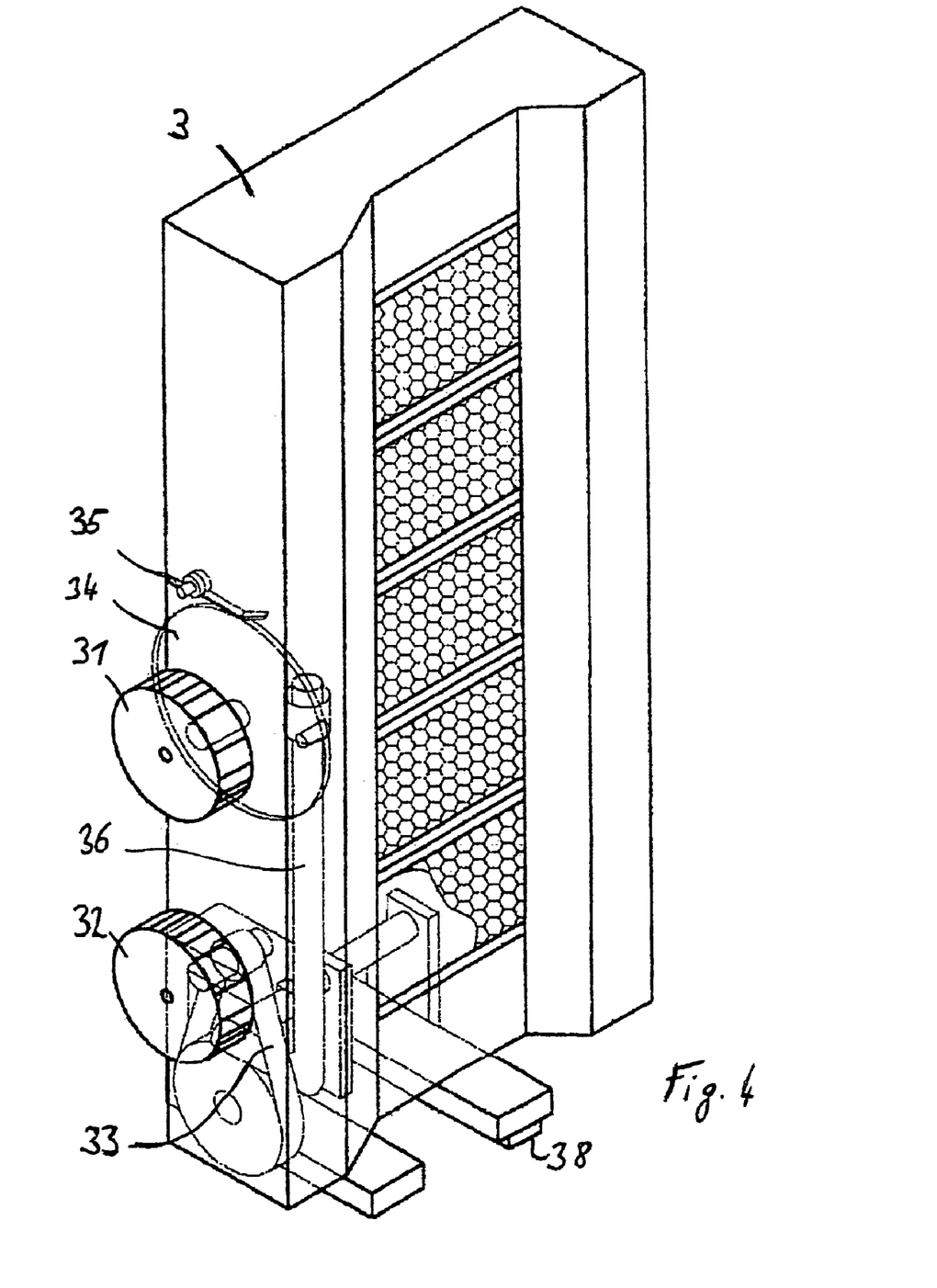
FIGS. 4 and 5 show individual views of a heating element.
Figure 5:
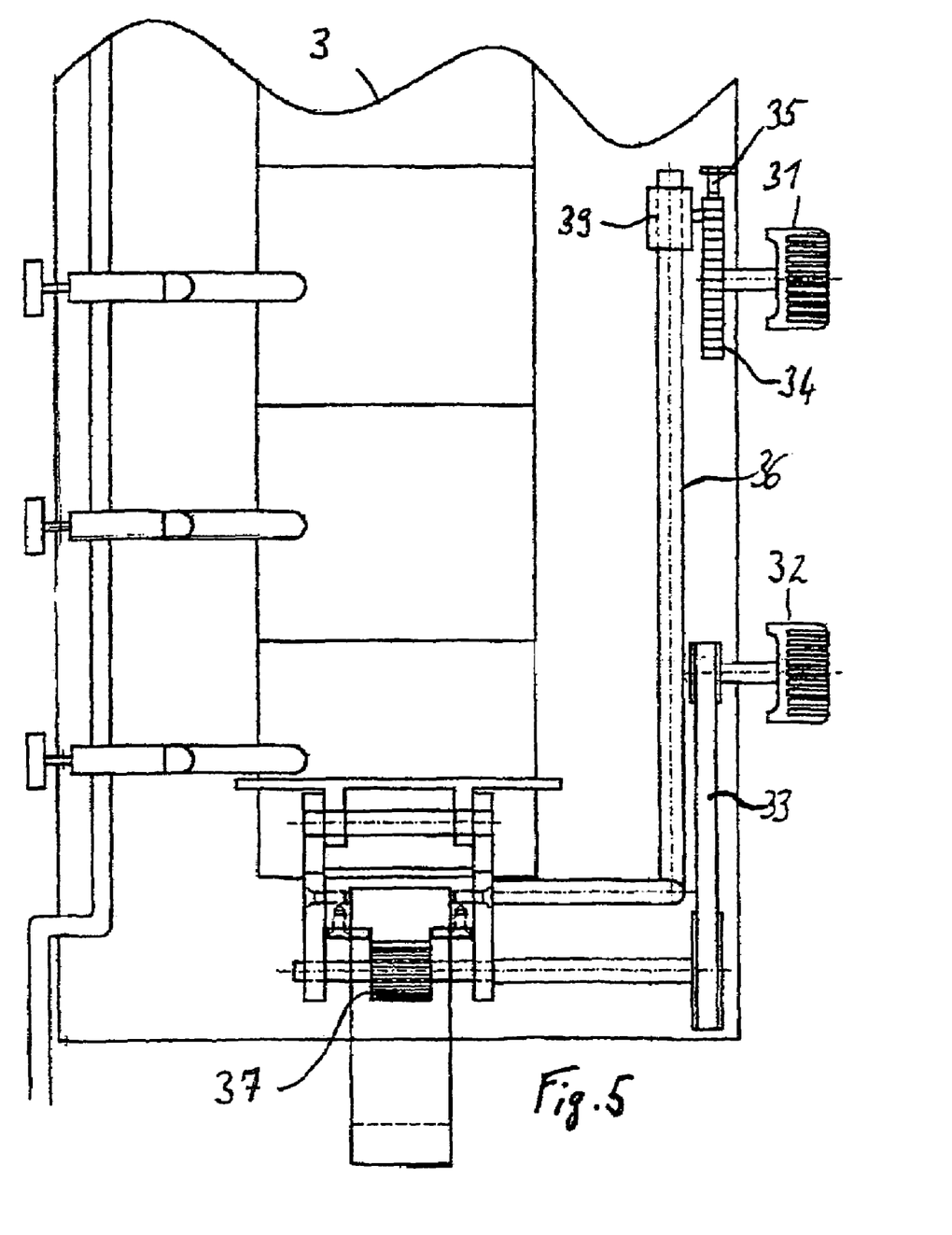

FIG. 4 shows a perspective representation of parts of a heating element 3 which has a height adjustment device 31 and a device 32 for adjusting the longitudinal position, both of these devices being in the form of rotary knobs. FIG. 5 shows such a heating element 3 in a cross-sectional view. The heating element is adjusted in height, to adapt it to the foodstuff that is to be grilled, via the rotary knob 31 which is connected in a rotationally fixed manner to a gear wheel 34, said gear wheel 34 being loaded via a spring 35 so that the height can be fixed via the spring 35 and correspondingly locked. A sliding sleeve 39 of the heating element 3 is mounted eccentrically on the gear wheel 34 so that, via a rotation movement of the rotary knob 31, the heating element 3 can be shifted in height. The sliding sleeve 39 is mounted displaceably on a positionally fixed rod 36.

To move the heating element toward or away from the object to be grilled, provision is made for adjustment via the rotary knob 32, a belt drive 33 and a rotatably mounted toothed roller 37, said toothed roller 37 engaging in a toothed rack 38 of a holder so that the heating element 3 is driven by corresponding rotation movements of the rotary knob 32.

The invention claimed is:

1. A rotating spit, comprising:
   a central body that supports foodstuffs arranged around the central body, the central body being provided with cooling; and
   a heating element acting outside of the foodstuffs, wherein the central body is provided with outlet openings which communicate with channels inside the foodstuffs to allow a cooled medium to flow through the foodstuffs and the channels formed inside the foodstuffs are connected to the central body and to a coolant stream via a cover cap provided with inlet and outlet lines.

2. A central body that is structured to support foodstuffs arranged around the central body, the central body comprising at least one hollow space into which a cooling medium is introduced and further comprising inlet and outlet lines connected to at least one cooling element running substantially parallel in relation with a longitudinal axis of the central body and through which the cooling medium flows from the inlet line and to the outlet line of the central body, wherein
   the at least one cooling element is coupled to the central body in a removable manner and is arranged at a radial spacing from the central body, and
   the at least one cooling element is two cooling elements that are oriented substantially parallel in relation to a longitudinal axis of the central body.

3. The central body as claimed in claim 2, wherein the central body is provided with cooling.

4. The central body as claimed in claim 2, wherein the central body has a hollow space which is filled with the cooling medium.

5. The central body as claimed in claim 2, wherein the central body is provided with at least one channel through which a cooling medium flows or which is filled with a cooling medium.

6. The central body as claimed in claim 2, wherein the central body is coupled to a heat exchanger.

7. The central body as claimed in claim 2, wherein the central body has at least one delivery channel and at least one removal channel for the cooling medium.

8. The central body as claimed in claim 2, wherein the cooling element is provided with at least one channel or hollow space through which a cooling medium flows or which is filled with a cooled medium.

9. A central body that is structured to support foodstuffs arranged around the central body, the central body comprising at least one hollow space into which a cooling medium is introduced and further comprising inlet and outlet lines connected to at least one cooling element running substantially parallel in relation with a longitudinal axis of the central body and through which the cooling medium flows from the inlet line and to the outlet line of the central body, wherein radially directed openings are provided in an outer wall of the central body for leading a cooling medium into channels formed in the foodstuff.

10. The central body as claimed in claim 9, wherein closure devices are provided for the openings in the outer wall of the central body.

* * * * *